Aug. 6, 1929.  C. J. DOLL  1,723,770
TRANSMISSION
Filed July 22, 1926   3 Sheets-Sheet 2

Inventor
Clyde J. Doll
By
Attorney

Aug. 6, 1929.     C. J. DOLL     1,723,770
TRANSMISSION
Filed July 22, 1926    3 Sheets-Sheet 3

Inventor
Clyde J. Doll

By [signature]
Attorney

Patented Aug. 6, 1929.

1,723,770

UNITED STATES PATENT OFFICE.

CLYDE J. DOLL, OF TRENTON, NEW JERSEY, ASSIGNOR TO EXCELLO TRANSMISSION COMPANY, OF CAMDEN, NEW JERSEY, A CORPORATION OF NEW JERSEY.

TRANSMISSION.

Application filed July 22, 1926. Serial No. 124,166.

The object of the invention is to provide a transmission wherein the application of power to the driven member is made intermittently from the driving member by a series of elements each operating during a period of inactivity by the other, so that the motion of the driven member will be substantially continuous; to provide a construction wherein the driven member is provided with a plurality of clutches of which each is provided with means whereby the clutching action is accomplished by movement imparted to the clutch in one direction but not in the other; and to provide means in connection with the clutches whereby clutching action may be accomplished in the reverse movement of the clutches, thus providing for the rotation of the driven member in the reverse direction.

With this obejct in view, the invention consists in a construction and combination of parts of which a preferred embodiment is illustrated in the accompanying drawings, wherein.

Figure 2:
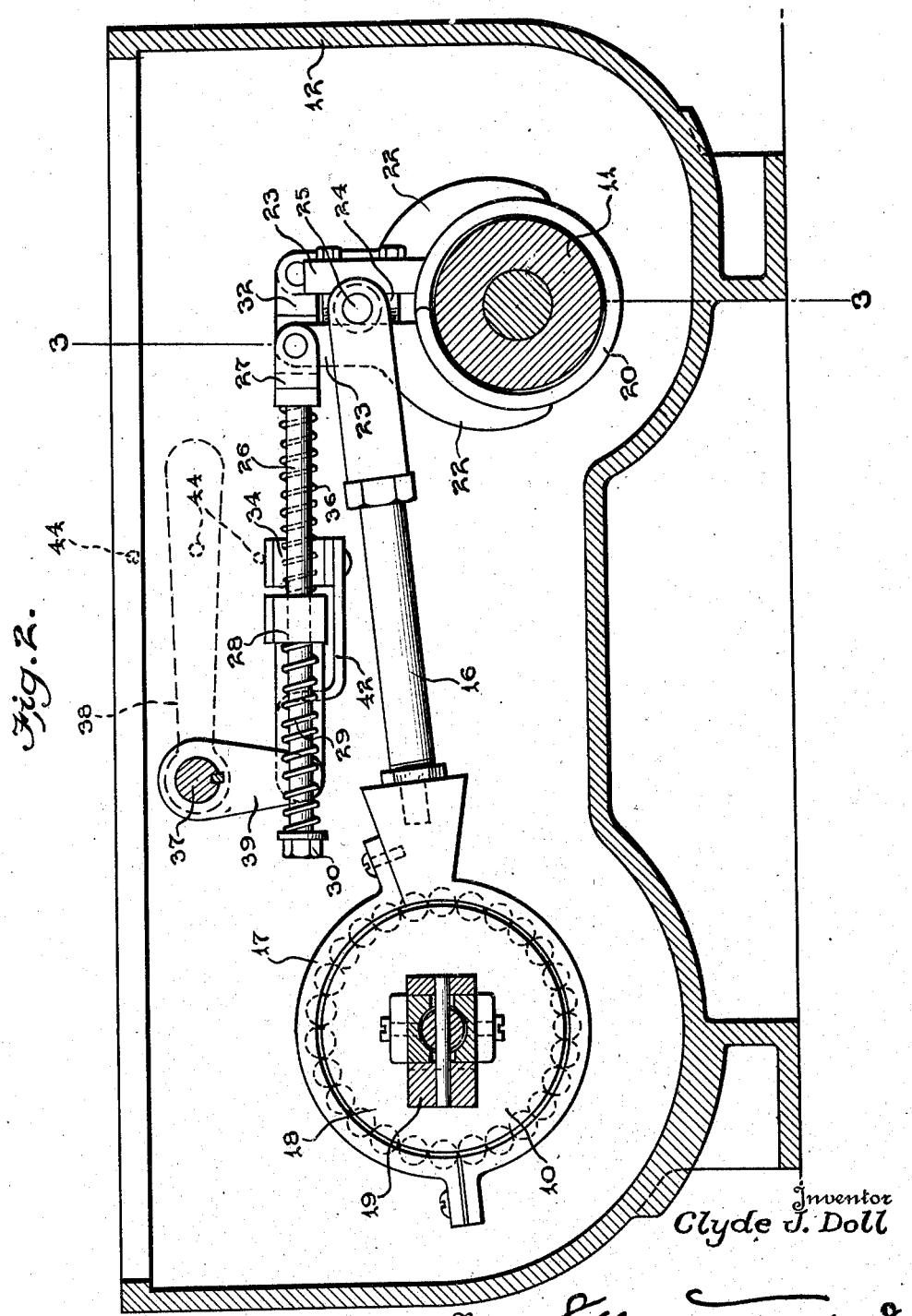
Figure 2 is a central longitudinal sectional view on the plane indicated by the line 2—2 of Figure 1.
Figure 3:
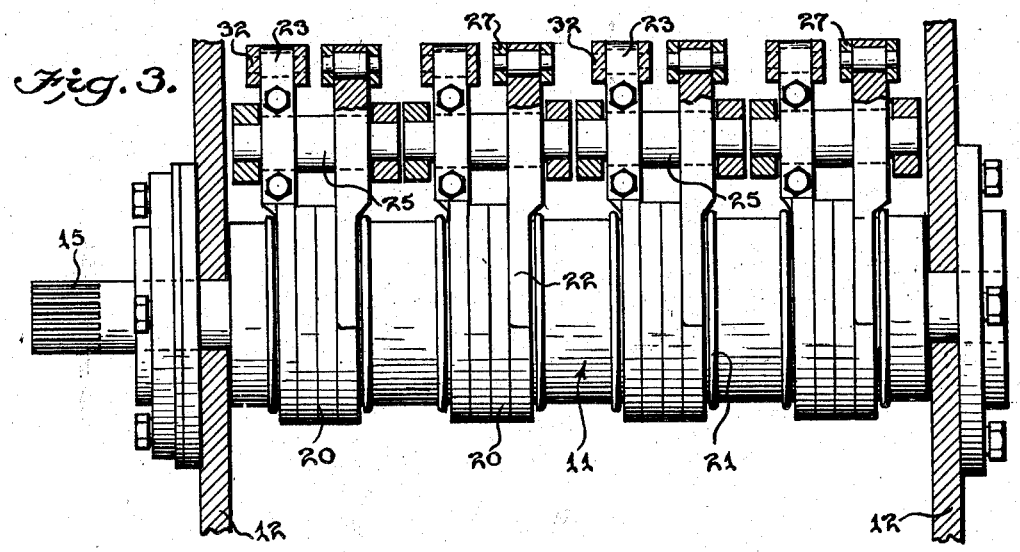
Figure 3 is a transverse sectional view on the plane indicated by line 3—3 of Figure 2.
Figure 1:
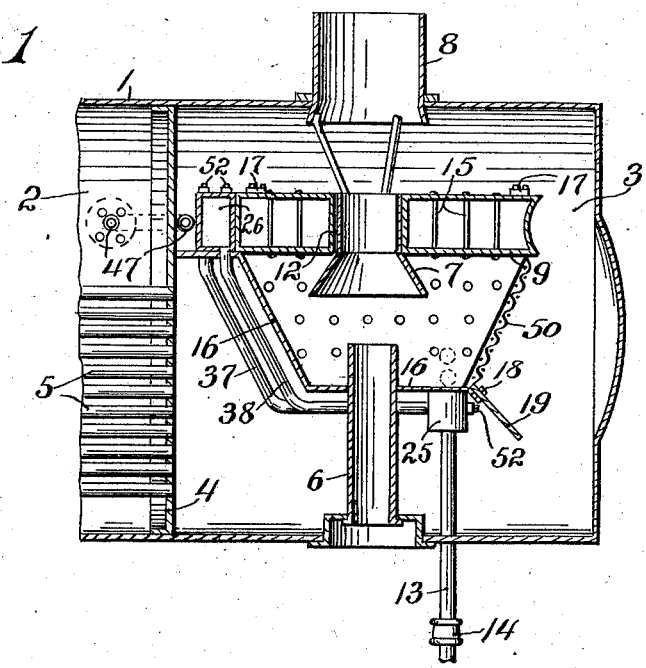
Figure 1 is a top plan view of a transmission constructed in accordance with the invention.
Figure 2:
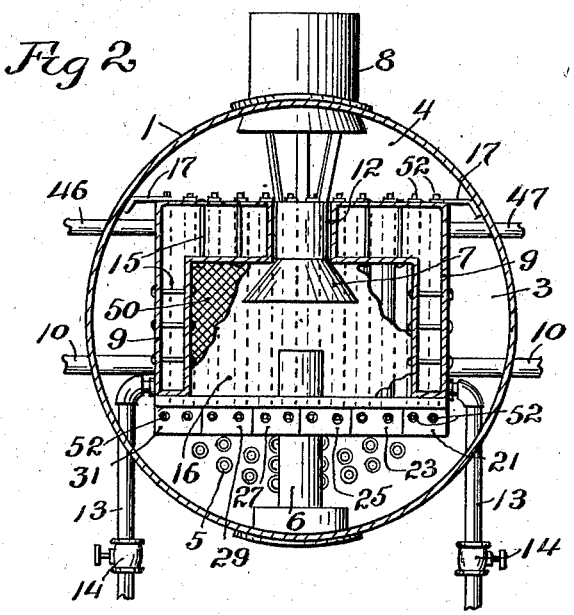

The driving and driven members 10 and 11 are disposed respectively in opposite ends of the transmission housing 12, being arranged in parallelism with the former extended beyond the housing, as at 14, for connection to a prime mover and the latter having its shaft extended beyond the casing at the other side, as indicated at 15, for connection to a load, such as the propeller shaft of an automobile. The rotary motion of the driving member is transmitted to the driven member through the instrumentality of connecting rods 16 connected with eccentric straps 17 encircling eccentrics 18 mounted on the driving member and variable in their degree of eccentricity by means of the wedge blocks 19 which are adjustable longitudinally of the driving member. The purpose of the wedge blocks is to vary the throw of the eccentrics and therefore to vary the length of stroke of the connecting rods 16 but the detail construction will not be gone into more fully than outlined above for the reason that this precise construction is shown in co-pending application filed October 20, 1925, Serial No. 63,682.

The driven member 11 is in the form of a drum and the clutches 20 are mounted upon and spaced uniformly along the drum, being in the form of spiral springs surrounding the drum and engaged in seats defined by peripheral ribs 21 encircling the drum and consisting preferably of cross sectionally round spring bands seated in grooves in the drum. The ribs 21 preclude movement of the clutches axially of the drum. The extremities of the springs constituting the clutches have secured to them, preferably by welding, the angular terminals 22 of which the arms 23 are disposed in parallelism but offset due to the terminal members 22 being secured to the opposite ends of the springs. Between the arms 23 of the terminals of each clutch, however, there is disposed a bearing 24 for a wrist pin 25, the connecting rod 16 of the associated eccentric being connected to this wrist pin.

Gripping action of the clutch member on the drum is accomplished by diametrical contraction of the former and when this takes place, rotary or angular movement is imparted to the drum due to the reciprocating movement of the connecting rod 16. It is the purpose, however, to provide for this diametrical contraction of the clutch in the movement of the connecting rod in either direction but not continuously—that is to say, if the mechanism is so arranged that the clutch member grips in the movement of the connecting rod in one direction, it continuously operates that way, sliding over the drum in the reverse direction. Means is provided, however, for effecting the reverse of this so that clutch action followed by slipping action of the clutch will be accomplished so as to rotate the drum in the reverse direction than previously.

The springs comprising the clutches are coiled to an internal diameter sufficient to permit sliding movement over the drum, unless there be the application of pressure on one of the arms 23 to produce in effect a diametrical contraction of the springs. Such a means is shown and is connected to both of the arms 23 of each clutch so that the application of pressure on either arm may be accomplished. In this way, gripping action larly connected to the other terminal of each of the springs, and means for adjusting the positions of the cross-heads to impose a pressure upon one terminal of each of the springs and relieve pressure upon the other terminal.

3. A transmission comprising driving and driven members of which the latter comprises a drum and a plurality of springs encircling the same and constituting clutches, reciprocating connecting rods between the driving member and the terminals of said springs, a pair of cross-heads of which one is operatively connected to one terminal of each of the springs and the other similarly connected to the other terminal of each of the springs, and manual means operatively connected with both cross-heads for adjusting the positions of the same to impose a pressure upon one terminal of each of the springs and relieve pressure upon the other terminal, said means being actuable for the positioning of the cross-heads to impose pressure upon both spring terminals but to reverse the application of and release of pressure thereon.

4. A transmission comprising driving and driven members of which the latter comprises a drum and a plurality of springs encircling the same and constituting clutches, reciprocating connecting rods between the driving member and the terminals of said springs, a pair of cross-heads of which one is operatively connected to one terminal of each of the springs and the other similarly connected to the other terminal of each of the springs, a rock shaft, an actuating lever connected with the rock shaft, and operative connections between the rock shaft and said cross-heads for moving the latter in synchronism whereby, upon actuation of the rock shaft, the cross-heads may be positioned to impose a pressure upon one terminal of each of the springs and relieve pressure on the other terminal or vice versa.

In testimony whereof he affixes his signature.

CLYDE J. DOLL.

Aug. 6, 1929.  C. G. DUFFY  1,723,771
FEED WATER HEATER
Filed July 25, 1927  2 Sheets-Sheet 1

INVENTOR.
Charles G. Duffy
BY Warren D. House
His ATTORNEY.